United States Patent [19]

Posso

[11] 4,196,806
[45] Apr. 8, 1980

[54] CASE-TYPE STORAGE BOX FOR SOUND AND/OR VIDEO RECORDING TAPE

[75] Inventor: Patrick P. Posso, Lausanne, Switzerland

[73] Assignee: Gefitec S.A., Switzerland

[21] Appl. No.: 938,010

[22] Filed: Aug. 30, 1978

[30] Foreign Application Priority Data

Sep. 7, 1977 [CH] Switzerland ............ 10927/77

[51] Int. Cl.[2] .................................. B65D 85/672
[52] U.S. Cl. ............................ 206/387; 206/389; 206/493; 242/199
[58] Field of Search .............. 206/389, 493, 387; 242/199

[56] References Cited

U.S. PATENT DOCUMENTS

| | | | |
|---|---|---|---|
| 3,232,421 | 2/1966 | Young | 206/387 |
| 3,272,325 | 9/1966 | Shoemmaker | 206/387 |
| 3,777,881 | 12/1973 | Schwartz | 206/387 |
| 4,087,145 | 5/1978 | Weavers | 206/387 |
| 4,131,197 | 12/1978 | Blankenmeister | 206/387 |
| 4,140,219 | 2/1979 | Somers | 206/387 |

FOREIGN PATENT DOCUMENTS 559955  3/1975  Switzerland ............ 206/387

*Primary Examiner*—Herbert F. Ross
*Attorney, Agent, or Firm*—Robert E. Burns; Emmanuel J. Lobato; Bruce L. Adams

[57] ABSTRACT

This case-type storage box for sound and/or video recording tape or film wound on a spool or core comprises at least one resilient arm provided with a projection comprising inclined ramps so that when the spool or the like is introduced into the box the arm is caused to deflect and, when the spool is in its home position, to subsequently resume its normal position in which ribs formed on the arm engage the spool core aperture.

13 Claims, 4 Drawing Figures

CASE-TYPE STORAGE BOX FOR SOUND AND/OR VIDEO RECORDING TAPE

FIELD OF THE INVENTION

The present invention relates in general to storage boxes or cases for holding sound and/or video recording tapes, and has specific reference to an improved structure for a case-type storage box of this general character, which is intended for tapes wound on at least one core or spool, and comprises means adapted to engage the core or spool for preventing the rotation thereof.

It is known in the art that a spool not locked against rotation is prone to release one or more turns of the tape during the transport and handling of the storage box enclosing it.

If the tape reel is enclosed in a cassette, one or more turns of the wound tape may become loose and project more or less from the winding plane, so as to either contact the cassette inner wall, which is a source of detrimental friction when playing or recording the cassette in a tape player/recorder or the like, this friction being capable of stopping the apparatus by locking same, or cause an untimely, random unwinding of the tape (sometimes referred to as a "growth") likely to jam and lock the tape.

DESCRIPTION OF THE PRIOR ART

Among known case-type storage boxes, a known proposition consisted in locking the spool core by means of detachable, separate stud. However, this solution requires an additional component element and besides the stud may be lost.

Another known solution (in the "MEMOREX" storage box) consists in using rubber studs engaging the central portion of the core and locking the latter by frictional contact. This solution is objectionable not only in that it requires the use of an insert made of a different material, but also because rubber particles are likely to be deposited on the tape or film, as a consequence of the frictional contact produced between the rubber studs and the core.

Another device, disclosed in the U.S. Pat. No. 3,783,200, comprises means for locking the spools in the cassette; this device is released by simply introducing the cassette into the player or recorder. It consists of a relatively complicated and therefore expensive mechanism comprising several component elements, and is therefore an additional source of trouble.

Storage boxes comprising a hingedly mounted cover designed for video-cassettes (U.S. Pat. No. 3,876,071) and comprising spring-loaded studs adapted to engage axially matching holes formed in the spool cores are also known. The studs are spring-mounted because they do not register in all cases very accurately with the holes when the cassette is inserted into the box, but they engage these holes when the cores start rotating.

The same shortcomings are observed when it is attempted to lock a free spool against movement in a storage box. Moreover, with this type of spool the problem of holding the outermost turn of the tape or film must also be solved. Up to now the outermost turn of the tape or film was prevented from getting loose by using a piece of adhesive tape for causing the tip of the tape to adhere to the second turn, but this solution is also objectionable because the pieces of adhesive tape must be removed before using the tape and once soiled this piece of tape is no more adhesive or may be lost. The use of a small U-shaped plastics rider adapted to clamp the outer periphery of the reel of tape or film is also known, but this device is liable to damage the edge of the reel and may also be easily lost.

SUMMARY OF THE INVENTION

It is the primary object of the present invention to hold the core or the outer periphery of a reel of tape or film carried by a spool mounted or not in a cassette, in its storage box or case, without resorting to any additional element.

For this purpose, the storage box according to this invention is characterized in that the means for locking the spool core is formed integrally with the box and consists of at least one projection rigid with at least one resilient arm adapted to bend when the spool is introduced into the box, said projection or projections being shaped to engage at least one cavity of the spool core.

Thus, the spool is locked against movement without resorting to any additional component element and without any risk of forming by abrasion detrimental deposits of foreign materials on the tape or film.

The device according to this invention is applicable both to a box designed for receiving a free spool and to a box designed for receiving a cassette with one or several spools.

DESCRIPTION OF THE PREFERRED EMBODIMENTS

Figure 1:
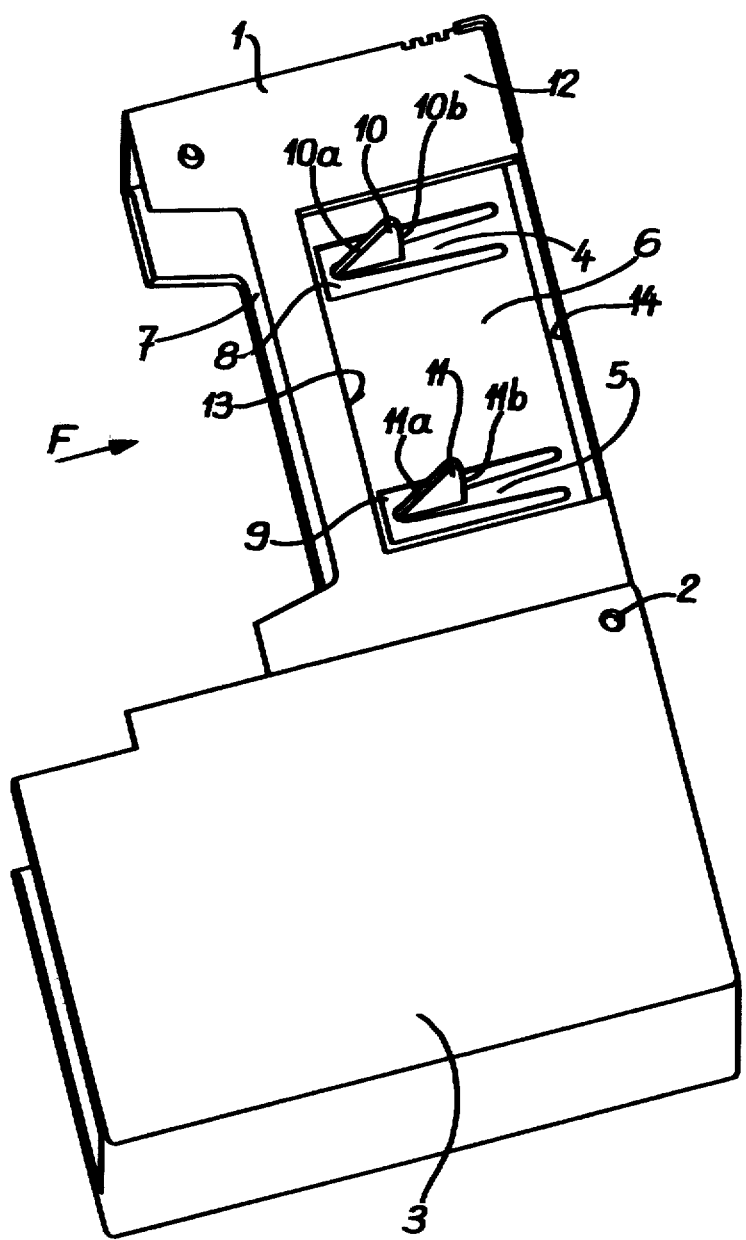
FIG. 1 is a perspective and diagrammatic view of a case-type storage box with pivoted cover for cassette.

Referring first to FIG. 1, the cassette storage box illustrated therein comprises a case-forming box, fold-up element or holder 1 adapted to receive a standard audiocassette (not shown). This case 1 is pivoted at 2 to another cover-forming element 3. The two elements 1 and 3 are injection-molded from a suitabe plastics material. Since this type of box is well known in the art, a detailed description thereof is not deemed necessary, except for the means provided according to the present invention for holding or locking against movement the spool cores of the cassette to be introduced into the case-forming element 1.

These means consist of a pair of resilient arms 4,5 formed or molded integrally with one of the major walls 6 of case 1. These arms 4 and 5 extend towards the open side 7 of the case within cut-outs 8 and 9 formed in said major wall 6. Each arm 4, 5 carries at its end adjacent the aperture 7 a projection or fin 10, 11 of substantially triangular shape extending at right angles to the wall 6 and molded integrally with the resilient arms. To simplify the manufacture, the wall 12 of the fold-up case 1, which is parallel to wall 6, has a rectangular aperture 13 formed therein which register with the projections or fins 10 and 11. Each projection comprises a first ramp-forming side 10a, 11a, inclined at about 45° towards the case aperture 7, and another relatively steep ramp 10b, 11b on the side adjacent the bottom 14 of said fold-up case 1.

When the user introduces the cassette into the pivoted case 1 through the aperture 7 and in the direction of the arrow F (FIG. 1), the cassette engages the pair of ramps 10a, 11a, thus bending the arms 4,5 and depressing the projections 10 and 11. When the cassette is properly positioned in the case 1 the projections 10 and 11 can snap resiliently into the central aperture of the spool cores and resume its initial position. The ramps 10b and 11b are thus caused to engage the gap formed between two teeth of said cores, thus locking the latter against rotation. The cassette can be removed from the case by simply pulling it, the inclination of ramps 10b and 11b being sufficient to cause the projections 10 and 11 to be depressed again by resiliently bending the arms 4 and 5.

It will be seen that the cassette is safely retained in the fold-up case 1 by the projections 10 and 11. Therefore, the cover portion 2 of the assembly acts simply as a protection device, not as a cassette retaining means as in hitherto known devices.

Figure 2:
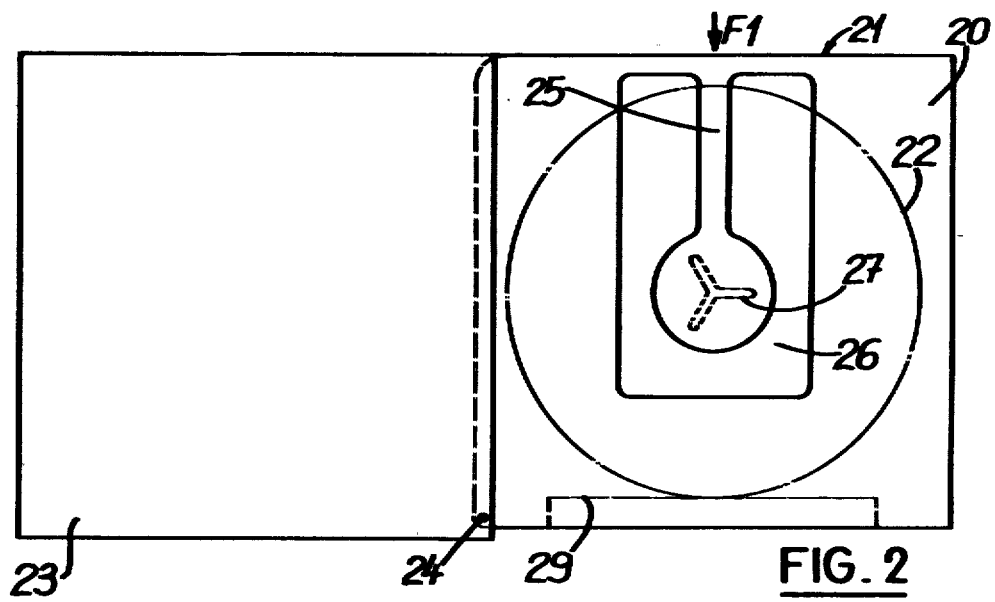
FIG. 2 is an elevational view of a case-type storage box with pivoted cover for a free spool shown in phantom lines.
Figure 4:
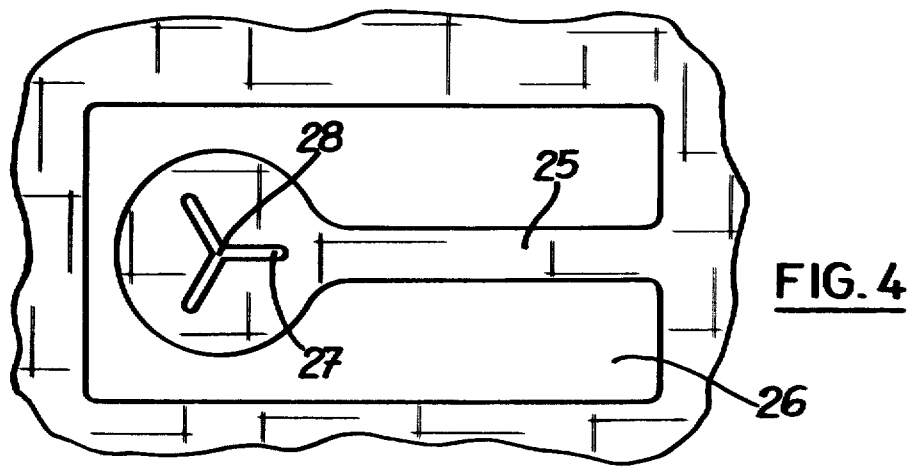
FIG. 4 is a plane view from above of the arm of FIG. 3.

FIGS. 2 and 4 show a modified form of embodiment of this invention intended for the storage of a free spool, such as a film spool or tape spool not mounted in a cassette.

As in the preceding example, the device comprises a fold-up element 20 constituting the case proper open on one of its narrow faces 21 to permit the introduction, in the direction of the arrow F1, of a free spool 22. Another protection case 23 is provided at 24 to the fold-up case 20.

In this case the locking means comprises a single resilient arm 25 having a widened free end. This arm 25 is molded integrally with a mojor wall of case 20 and extends in a direction opposite the aperture 21 into a cut-out 26 formed in said major wall. On the face of arm 25 facing the interior of case 20 a projection 27 consisting of three spaced ramp-forming ribs extending from a common vertex 28 are formed integrally by molding with the resilient arm 25 on the widened portion thereof.

Figure 3:
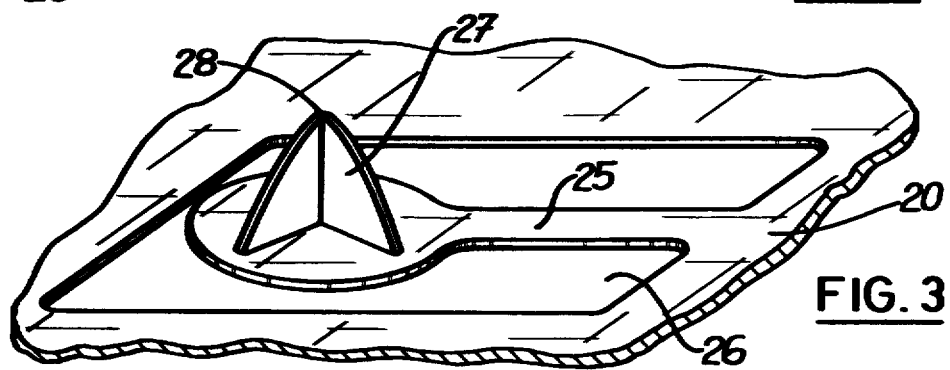
FIG. 3 is a perspective view of the inner surface of the resilient arm, showing the shape of the projection carried thereby.

When the spool 22 is introduced in the direction of the arrow F1 into the fold-up case 20, it engages the inclined ribs of projection 27, thus causing the arm 25 to be deflected outwardly as in the preceding example. When the spool is eventually in its home position, the arm resumes by inherent elasticity its normal position and the projection 27 engages the spool core, the ribs engagins the gaps formed between adjacent teeth of the core so as to lock the latter against rotation. When the spool is pulled out from the case 20, the inclination of the ramps formed on the ribs causes the arm 25 to be deflected to permit the removal of the spool, before resuming again its normal position as shown in FIG. 3

Besides, the botom of the case 20 opposite the aperture 21 is lined with a pad 29 of resilient synthetic plastics so that when the spool is introduced into the case it will bear against this pad to prevent the tape or film from unwinding untimely, the mutual engagement between the tape or film spool 22 and the pad 29 resulting from the retaining action exerted by the projection 27.

The resilient arms 4,5 or 25 may of course be disposed with a different orientation, for example upside down with respect to the position illustrated in the Figures, or even transversely to this direction. These resilient arms may have any other suitable shape, for example an arcuate or even spiral shape. Moreover, a plurality of resilient arms may be provided for holding each core against movement, the ends of these resilient arms converging towards the position corresponding to the core center and being each provided with a projection for locking this core against movement.

It will readily appear to those conversant with the art that the device according to this invention is applicable to all types of case-type storage boxes and the like for cassette, cartridges, spools and cores for tapes and films.

What is claimed is:

1. A storage box for a tape cassette having two reels with hubs and hub openings, said storage box comprising:
   an inner case comprising spaced parallel major walls and three side walls joining said major walls at three side edges thereof, a fourth side being open, said major walls being spaced apart to receive flatwise between them a cassette inserted through said open side in a direction parallel to said major walls,
   an outer case having spaced parallel major walls and at least two side walls joining said major walls of said outer case at their edges, at least one side of said outer case being open, said major walls of said outer case being spaced apart to receive said inner case between them,
   means pivotally connecting said inner case with said outer case at one corner for pivotal movement of said inner case between a closed position in which it is in said outer case and an open position in which it is mostly outside said outer case,
   spring arms each in the plane of and defined by a cut-out in a major wall of said inner case, each of said arms extending from a position near a side edge of said major wall to a position overlying the hub of a reel of a cassette positioned in said inner case, and
   an integral projection at the end of each of said arms projecting inwardly into the interior of said inner case in position to be received in the hub opening of a reel of said cassette when positioned in said inner case to hold said hub against rotation, said projection having an apex, a forward ramp sloping from the plane of said arm to said apex in a direction away from said open side of said inner case and a rearward ramp sloping from the plane of said arm to said apex in a direction toward said open side of said inner case,
   whereby a cassette inserted into said inner case, when in open position, through the open side thereof engages said forward ramp to spring said resilient arm outwardly to permit entry of the cassette into said inner case in a direction parallel to said major walls, said arm springing back when the cassette reaches a position in said inner case to move said projection into a hub opening of a reel of the cassette to hold said reel against rotation, and said cassette being engageable with said rearward ramp to spring said resilient arm outwardly to permit removal of said cassette through said open side of said inner case by a force exerted on said cassette in a direction parallel to said major walls and toward said open side of said inner case.

2. A cassette storage box according to claim 1, in which said rearward ramp is inclined at a materially greater angle to the plane of said arm than is said forward ramp whereby the force required to remove said cassette from said inner case is greater than the force required to insert the cassette.

3. A cassette storage box according to claim 1, in which said projection comprises substantially triangular fins having a common apex constituting said apex of said projection.

4. A cassette storage box according to claim 3, in which one of said fins constitutes said forward ramp and another of said fins constitutes said rearward ramp.

5. A cassette storage box according to claim 1, in which said arm extends in a direction generally parallel to the direction of movement of said cassette in insertion into and removal from said inner case.

6. A cassette storage box according to claim 5, in which said arm joins said major wall of said inner case near the closed side of said inner case which is opposite said open side, and extends toward said open side of said inner case.

7. A storage box for a tape or film reel having a hub with a hub opening, said storage box comprising:

an inner case comprising spaced parallel major walls and three side walls joining said major walls at three side edges thereof, a fourth side being open, said major walls being spaced apart to receive flatwise between them a reel inserted through said open side in a direction parallel to said major walls, an outer case having spaced parallel major walls and at least two side walls joining said major walls of said outer case at their edges, at least one side of said outer case being open, said major walls of said outer case being spaced apart to receive said inner case between them, means pivotally connecting said inner case with said outer case at one corner for pivotal movement of said inner case between a closed position in which it is in said outer case and an open position in which it is mostly outside said outer case, a spring arm in the plane of and defined by a cut-out in a major wall of said inner case, each of said arms extending from a position near a side edge of said major wall to a position overlying the hub of a reel positioned in said inner case, and an integral projection at the end of said arm projecting inwardly into the interior of said inner case in position to be received in the hub opening of said reel when positioned in said inner case to hold said reel against rotation, said projection having an apex, a forward ramp sloping from the plane of said arm to said apex in a direction away from said open side of said inner case and a rearward ramp sloping from the plane of said arm to said apex in a direction toward said open side of said inner case, whereby a reel inserted into said inner case, when in open position, through the open side thereof engages said forward ramp to spring said resilient arm outwardly to permit entry of the reel into said inner case in a direction parallel to said major walls, said arm springing back when the reel reaches a position in said inner case to move said projection into the hub opening of said reel to hold said reel against rotation, and said reel being engageable with said rearward ramp to spring said resilient arm outwardly to permit removal of said reel through said open side of said inner case by a force exerted on said reel in a direction parallel to said major walls and toward said open side of said inner case.

8. A reel storage box according to claim 7, in which said rearward ramp is inclined at a materially greater angle to the plane of said arm than is said forward ramp, whereby the force required to remove said reel from said inner case is greater than the force required to insert the reel.

9. A reel storage box according to claim 7, in which said projection comprises substantially triangular fins having a common apex constituting said apex of said projection.

10. A reel storage box according to claim 9, in which said projection comprises three of said fins angularly spaced from one another.

11. A reel storage box according to claim 7, in which said arm extends in a direction generally parallel to direction of movement of said reel in insertion into and removal from said inner case.

12. A reel storage box according to claim 11, in which said arm joins said major wall of said inner case near said open side of said inner case and extends in a direction away from said open side.

13. A reel storage box according to claim 12, further comprising a pad of resilient plastic material fixed to a closed side of said inner case opposite said open side in position to be engaged by tape or film on said reel to prevent said tap or film from unwinding.

* * * * *